United States Patent
Mondal et al.

(10) Patent No.: US 12,021,588 B2
(45) Date of Patent: Jun. 25, 2024

(54) CSI MEASUREMENT AND REPORT QUALITY DEFINITION FOR 5G NR MULTI-TRP

(71) Applicant: Apple Inc., Cupertino, CA (US)

(72) Inventors: Bishwarup Mondal, San Ramon, CA (US); Yushu Zhang, Beijing (CN); Alexei Davydov, Nizhny Novgorod (RU); Gregory V. Morozov, Nizhny Novgorod (RU); Victor Sergeev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 17/287,186

(22) PCT Filed: Oct. 30, 2019

(86) PCT No.: PCT/US2019/058714
§ 371 (c)(1),
(2) Date: Apr. 21, 2021

(87) PCT Pub. No.: WO2020/092468
PCT Pub. Date: May 7, 2020

(65) Prior Publication Data
US 2021/0359742 A1 Nov. 18, 2021

Related U.S. Application Data

(60) Provisional application No. 62/755,362, filed on Nov. 2, 2018.

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04B 7/0632* (2013.01);
(Continued)

(58) Field of Classification Search
None
See application file for complete search history.

(56) References Cited

U.S. PATENT DOCUMENTS 9,420,487 B2 8/2016 Jung et al.
2016/0204910 A1* 7/2016 Kim ................... H04B 7/024
370/252

(Continued)

FOREIGN PATENT DOCUMENTS

WO    WO-2012146041 A1 * 11/2012 ........... H04B 7/0626

OTHER PUBLICATIONS

International Report on Patentability dated Apr. 27, 2021 in connection with PCT Application No. PCT/US2019/058714.
(Continued)

*Primary Examiner* — Sudesh M Patidar
(74) *Attorney, Agent, or Firm* — Eschweiler & Potashnik, LLC (57) ABSTRACT

Methods, systems, and circuitries for configuring, measuring, and reporting channel state information are described. In one embodiment, an apparatus for a user equipment device (UE) includes processors configured to determine first channel state information (CSI) reference signal (RS) resource associated with a serving cell for the UE and determine a second CSI-RS resource associated with a non-serving cell for the UE. A first reference signal received in the first CSI-RS resource and a second reference signal received in the second CSI-RS resource are measured. First report quantities characterizing a channel between the UE and the serving cell are calculated based on the measurement
(Continued)

of the first reference signal and second report quantities characterizing a channel between the UE and the non-serving cell are calculated based on the measurement of the second reference signal. The first and second report quantities are reported to the serving cell.

14 Claims, 4 Drawing Sheets

(51) Int. Cl.
*H04W 24/10* (2009.01)
*H04W 72/0446* (2023.01)
*H04W 72/0453* (2023.01)
*H04W 72/1263* (2023.01)

(52) U.S. Cl.
CPC .......... *H04B 7/0639* (2013.01); *H04W 24/10* (2013.01); *H04W 72/0446* (2013.01); *H04W 72/0453* (2013.01); *H04W 72/1263* (2013.01)

(56) References Cited

U.S. PATENT DOCUMENTS

| | | | | |
|---|---|---|---|---|
| 2016/0301505 | A1* | 10/2016 | Furuskog | H04W 72/00 |
| 2017/0366981 | A1* | 12/2017 | Takano | H04B 7/0469 |
| 2018/0034612 | A1* | 2/2018 | Lin | H04L 25/0224 |
| 2018/0278313 | A1* | 9/2018 | Kim | H04B 7/0413 |
| 2019/0260448 | A1* | 8/2019 | Rahman | H04B 7/0632 |
| 2020/0029238 | A1* | 1/2020 | Si | H04W 24/10 |
| 2021/0242995 | A1* | 8/2021 | Noh | H04J 13/00 |

OTHER PUBLICATIONS

PCT Search Report dated Feb. 14, 2020 in connection with PCT Application No. PCT/US2019/058714.
PCT Written Opinion dated Feb. 14, 2020 in connection with PCT Application No. PCT/US2019/058714.
ETSI TS 138 331 V15.3.0, '5G; NR; Radio Resource Control (RRC); Protocol specification', 3GPP TS 38.331 version 15.3.0 Release 15, Sep. 26, 2018 See sections 5.3.5.3, 5.5.3.1, 5.5.4.1, 5.5.5.1, 6.3.2.
ETSI TS 138 214 V15.3.0, 5G; NR; Physical layer procedures for data 3GPP TS 38.214 version 15.3.0 Release 15, Oct. 1, 2018 See sections 5.1.6.1.3, 5.2.2.3.1.
Ericsson, 'L1-RSRP reporting on non-serving cells', R1-1811509, 3GPP TSG RAN WG1 Meeting #94bis, Chengdu, China, Sep. 28, 2018 See section 2.
Intel Corporation, 'Draft CR: Correction to non-precoded NZP CSI-RS resource configurations', R1-1810735, 3GPP TSG RAN WG1 Meeting #94bis, Chungdu, China, Sep. 29, 2018 See section 6.10.5.

* cited by examiner

CSI MEASUREMENT AND REPORT QUALITY DEFINITION FOR 5G NR MULTI-TRP

CROSS REFERENCE TO RELATED APPLICATIONS

This application is a National Phase entry application of International Patent Application No. PCT/US2019/058714 filed Oct. 30, 2019, which claims priority to U.S. Provisional Patent Application No. 62/755,362 filed on Nov. 2, 2018, entitled "CSI MEASUREMENT AND REPORT QUALITY DEFINITION FOR 5G NR MULTI-TRP," which is incorporated herein by reference for all purposes.

BACKGROUND

Various examples generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that meets vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Figure 1:
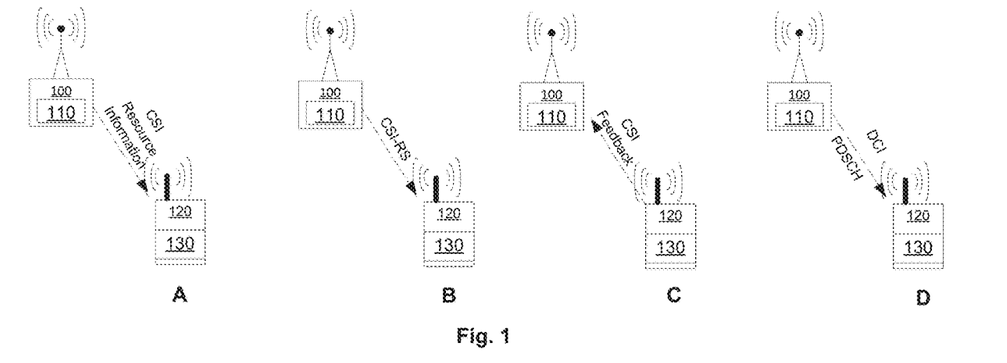
FIG. 1 depicts an exemplary wireless communication network that includes a transmission/reception point (TRP) and a user equipment device (UE) performing downlink communication in accordance with some examples.
Figure 4:
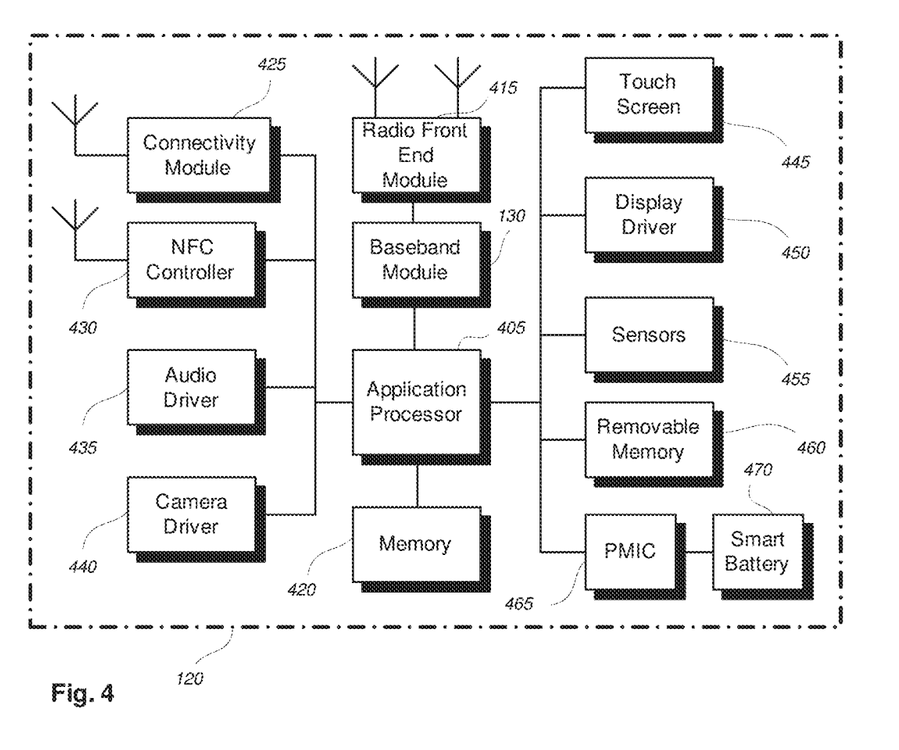
FIG. 4 illustrates a functional block diagram of an exemplary UE wireless communication device in accordance with some examples.
Figure 5:
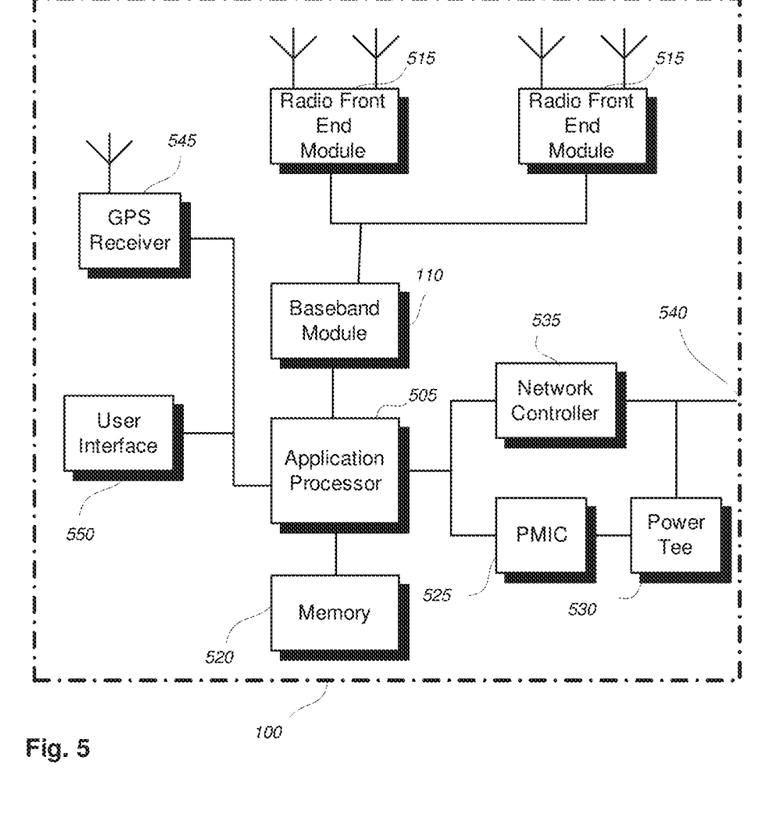
FIG. 5 illustrates a functional block diagram of an exemplary TRP/base station wireless communication device in accordance with some examples.

FIG. 1 illustrates a general overview of an exemplary downlink procedure for a wireless communication network that includes a transmission/reception point (TRP) (e.g., eNB, gNB, base station, and so on) and a user equipment device (UE) 120. An exemplary UE 120 is illustrated in FIG. 4 and an exemplary TRP 100 is illustrated in FIG. 5. The TRP 100 includes a baseband processor 110 that performs various functions for wireless communication. In the following description, if a TRP is described as performing some function, it is to be understood that it is processor 110 that is performing the function. The UE 120 includes a baseband processor 130 that performs various functions for wireless communication. In the following description, if a UE is described as performing some function, it is to be understood that it is processor 130 that is performing the function.

As illustrated at A, to facilitate determination of the physical downlink shared channel (PDSCH) for beamformed communication from the TRP 100 to the UE 120 the TRP 100 transmits channel state information (CSI) configuration to the UE 120. The CSI configuration defines which resources are used to transmit CSI reference signals (RS). The CSI configuration may also include information that describes a "hypothesis" to be used by the UE when measuring the CSI-RS. The hypothesis includes assumptions that can be made by the UE about particular transmission parameter settings used by the TRP 100 when transmitting the PDSCH. The parameters defined in the hypothesis may include parameters such as, for example CSI resource index (CRI), rank indicator (e.g., a number of layers for the transmit signal), a precoder matrix indicator, and channel quality indicator (CQI). The CSI information may also include information about what "report quantities" the TRP 100 expects the UE 120 to calculate and report back to the TRP to characterize the channel between the TRP and the UE.

As illustrated at B, after receiving this configuration from the TRP 100, the UE 120 monitors the CSI resources to receive and measure the CSI-RS. The UE 120 calculates several report quantities based on the received CSI-RS and the hypothesis. As shown at C, the UE 120 transmits CSI feedback that includes the report quantities to the TRP 100. The TRP 100 determines the PDSCH that should be used for downlink communication with the UE 120 based on the CSI feedback. As illustrated in D, the TRP 100 transmits downlink control information (DCI) to the UE 120 to describe the PDSCH that will be used for downlink communication as well as the timing during which the UE should monitor for downlink data. The TRP 100 then transmits downlink data using the PDSCH. Based on CSI feedback another TRP may transmit DCI and PDSCH to the same UE.

Figure 2:
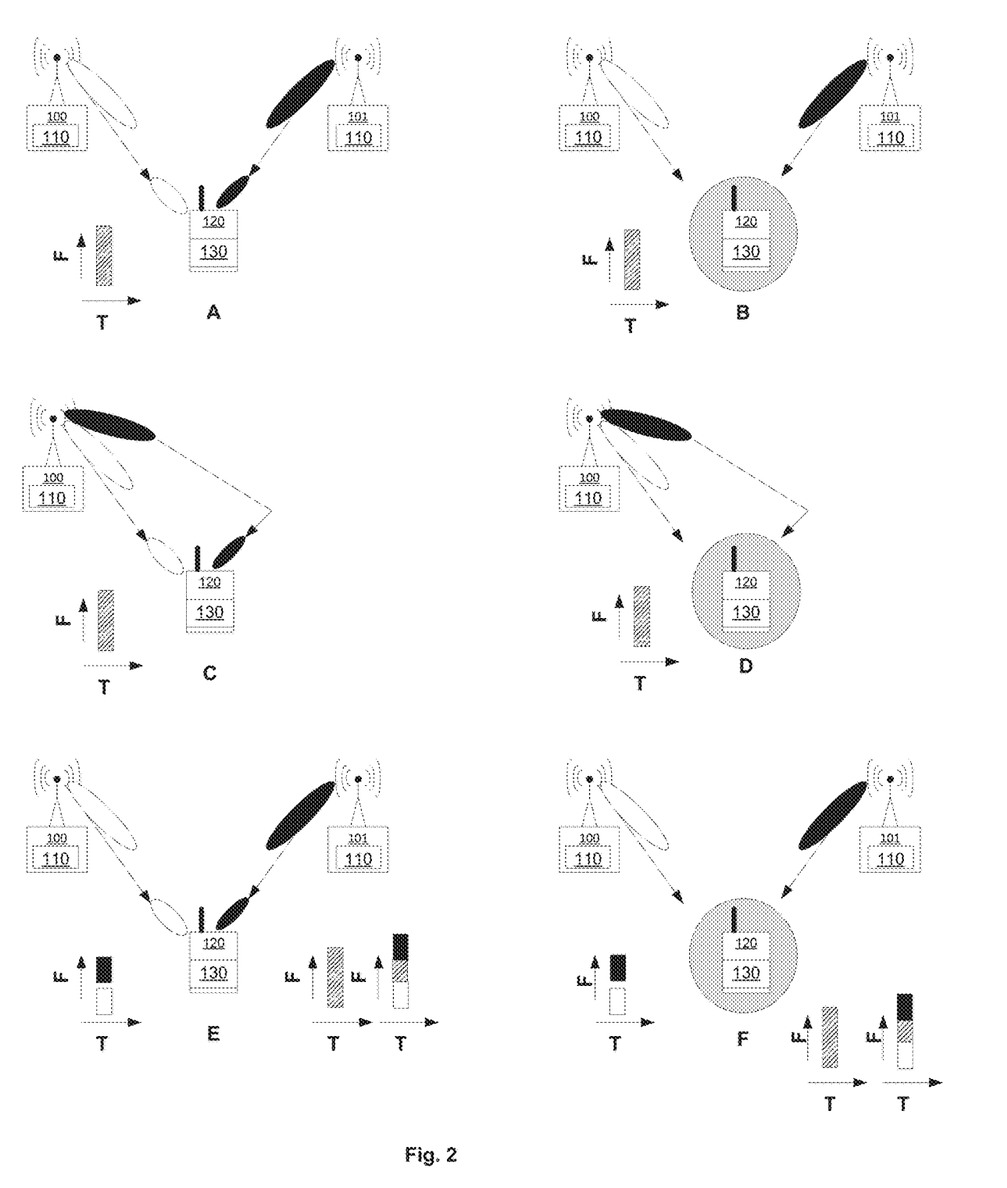
FIG. 2 depicts several use cases for an exemplary wireless communication network that includes one or two transmission/reception points (TRPs) and a user equipment device (UE) performing downlink communication in accordance with some examples.

5G NR improves downlink communication by supporting joint transmission in which multiple downlink channels are used for downlink communications to the same UE. The multiple channels may be from multiple TRPs or a single TRP. FIG. 2 illustrates six different use cases with multiple TRPs and/or downlink channels with respect to a UE.

Illustrations A through D illustrate multi-TRP transmission with a single downlink control information (DCI) option. In these use cases a single PDSCH (i.e., downlink data block or transport block TB) is transmitted by multiple TRPs/channels and is allocated by a single DCI. Specifically the use cases A-D are applicable in a single TRP multi-panel scenario, where all information can be included in one DCI.

Illustration A illustrates a scenario in which each TRP 100, 101 transmits a portion of a PDSCH in FR2 such that the TRPs and the UE 120 utilize beamforming. In this scenario the PDSCH transmissions from the two different TRPs fully overlap in time and frequency as shown. Illustration B illustrates a scenario in which each TRP 100, 101 transmits a portion of a PDSCH in FR1 such that the TRPs utilize beamforming while the UE 120 does not. In this scenario the PDSCH transmissions from the two different TRPs fully overlap in time and frequency as shown. Illustration C illustrates a scenario in which a TRP 100 transmits a portion of a PDSCH using a first beam (white) and another portion of the PDSCH using a second beam (black) in FR2 such that the TRPs and the UE 120 utilize beamforming. In this scenario the PDSCH transmissions in the two different beams fully overlap in time and frequency as shown. The scenario of illustration C may be used when multiple layers are available for transmission to the UE 120. Illustration D illustrates a scenario in which a TRP 100 transmits a portion of a PDSCH in a first sector (white) and another portion of the PDSCH using a second sector (black) in FR1 such that the TRPs utilize beamforming while the UE 120 does not. In this scenario the PDSCH transmissions from the two different TRPs fully overlap in time and frequency as shown.

Illustrations E and F illustrate multi-TRP transmission with a multiple DCI option that can be defined as the case of multiple PDSCHs transmitted to a UE in the same slot (potentially overlapping time-frequency resource). In these scenarios a unique PDSCH (e.g., downlink data block/TB) is transmitted from a TRP and is associated with a distinct DCI. In illustration E, TRP 100 transmits PDSCH #0 and TRP 101 transmits PDSCH #1 in FR2 such that the TRPs and the UE 120 utilize beamforming. In this scenario the PDSCH transmissions may fully overlap in time and frequency, partially overlap in time and frequency, or not overlap in time and frequency as shown. In illustration F, TRP 100 transmits PDSCH #0 and TRP 101 transmits PDSCH #1 in FR1 such that the TRPs utilize beamforming while the UE 120 does not. In this scenario the PDSCH transmissions may fully overlap in time and frequency, partially overlap in time and frequency, or not overlap in time and frequency as shown.

It is natural to consider that a multi-DCI option can be supported with a signaling framework similar to dual connectivity (although in this case tight synchronization among the TRPs is desired). Therefore it is expected that the coordinating TRPs negotiate on the sharing of UE capability and resources so that the UE's capabilities are not exceeded. This includes the maximum number of HARQ processes, TBs, layers, CORESETs, TCIs, search spaces, and so on.

It can be seen in FIG. 2 that the addition of TRPs and/or channels for joint transmission will involve the UE receiving CSI-RS from multiple TRPs/channels and reporting measurements back to multiple TRPs for use in PDSCH selection. Disclosed herein are mechanisms for supporting CSI feedback for NC-JT (non-coherent joint transmission) multi-TRP transmission. In particular, described are: methods for configuring CSI-RS resources for two TRPs including the case where a TRP may belong to a separate gNB (serving cell) and may not be tightly coordinated; methods for defining NC-JT CSI hypotheses for the case of two PDSCHs or two TBs; methods for defining NC-JT CSI hypotheses for the case of a single PDSCH or a single TB; and methods for requesting NC-JT CSI feedback.

LTE has defined NC-JT in Rel-15 with respect to tight coordination between TRPs and with respect to closed loop spatial multiplexing only. Tight coordination between TRPs and other transmission schemes like semi-open-loop, precoded CSI-RS and hybrid transmission are not considered herein. The following chart outlines where certain terms are defined in the 3GPP specification.

| Terminology | Definition |
| --- | --- |
| Serving cell | 38.214-f20 |
| NZP-CSI-RS-ResourceSet | 38.331-f30 |
| NZP-CSI-RS-Resource | 38.331-f30 |
| CSI-RS-Resource-Mobility | 38.331-f30 |
| CSI-RS-CellMobility | 38.331-f30 |
| CSI-RS-ResourceConfigMobility | 38.331-f30 |
| QCL | 38.214-f20 |
| physCellId | 38.331-f30 |
| measObject | 38.331-f30 |
| codebookConfig | 38.331-f30 |
| LI (layer-indicator) | 38.214-f20 |
| cri-RI-PMI-CQI | 38.331-f30, 38.214-f20 |
| cri-RI-LI-PMI-CQI | 38.331-f30, 38.214-f20 |
| cri-RI-i1 | 38.331-f30, 38.214-f20 |
| cri-RI-i1-CQI | 38.331-f30, 38.214-f20 |
| cri-RI-CQI | 38.331-f30, 38.214-f20 |
| pdsch-BundleSizeForCSI | 38.331-f30, 38.214-f20 |

CSI-Resource Definition

When two different TRPs are transmitting to the same UE and one of the TRPs is not in the serving cell, the serving cell may provide the CSI resource information for the TRP in the non-serving cell to the UE as follows. NZP-CSI-RS-Resource-A is associated with a NZP-CSI-RS-ResourceSet that is configured by the serving cell. NZP-CSI-RS-Resource-B (e.g., the CSI resources for the TRP in the non-serving cell) is configured by the serving cell similar to CSI-RS based RRM configuration. As an example, the NZP-CSI-RS-Resource-B can be configured using CSI-RS-Resource-Mobility parameter which is part of CSI-RS-CellMobility which is part of CSI-RS-ResourceConfigMobility. NZP-CSI-RS-Resource-B and NZP-CSI-RS-Resource-A may or may not be the same periodicity type. The time domain behavior for CSI-RS resource set including NZP-CSI-RS-Resource-B and that including NZP-CSI-RS-Resource-A may or may not be the same.

CSI-RS-Resource-Mobility, CSI-RS-CellMobility, CSI-RS-ResourceConfigMobility includes the PCID (physical cell identity), SCS (sub-carrier spacing), measurement bandwidth, SSB (synchronization signal and PBCH block) that is QCL-ed (Quasi co-located), number of ports, frequency and time-domain resource element (RE) mapping for all ports, scrambling sequence, that is needed for channel estimation for NZP-CSI-RS-Resource-B. NZP-CSI-RS-Resource-B is periodic. The number of ports for NZP-CSI-RS-Resource-B could range from 1-32.

A UE considers NZP-CSI-RS-Resource-B as applicable for deriving NC-JT measurements when it is included in the csi-rs-CellMobility including the physCellId of the cell in the CSI-RS-ResourceConfigMobility in the associated measObject. The parameter powerControlOffsetSS indicates the power offset between the NZP CSI-RS resource and Synchronization Signal Block (SSB) transmitted in the same component carrier (CC) in the physical cell indicated by physCellId.

When both TRPs are members of the same serving cell, NZP-CSI-RS-Resource-A and NZP-CSI-RS-Resource-B are associated with a NZP-CSI-RS-ResourceSet that is configured by the serving cell.

CSI-Hypothesis Definition

When two different TRPs are transmitting two different PDSCHs to the same UE, the NC-JT CSI hypothesis for the two different PDSCHs may be defined for the UE using a hypothesis set selection parameter as follows.

A CSI-ReportConfig is associated with NZP-CSI-RS-Resource-A as a channel measurement resource for the $1^{st}$ PDSCH and is associated with NZP-CSI-RS-Resource-B as a channel measurement resource for a $2^{nd}$ PDSCH. The CSI-ReportConfig is associated with a NC-JT CSI Hypotheses Type 1-10. The CSI-ReportConfig is associated with a codebookConfig applied to NZP-CSI-RS-Resource-A and the same or a separate codebookConfig for NZP-CSI-RS-Resource-B.

Note that NZP-CSI-RS-Resource-A acts as channel measurement resource for the first PDSCH and contributes to interference for the second PDSCH. NZP-CSI-RS-Resource-B acts a channel measurement resource for the second PDSCH and contributes to interference to the first PDSCH. Note that in FR2 or in case phase-noise is a significant issue for Tx/Rx link LI may be included with CSI-resource index (cri)-rank indicator (RI)-precoding matrix indicator (PMI)-channel quality indicator (CQI) that may be indicated as cri-RI-PMI-CQI-LI. Alternatively gNB can indicate UE to report LI when measured rank is above 1. Note that a single PDSCH comprises of one or more codewords (transport blocks).

For the purposes of CSI computation hypothesis, a UE may assume the following:

$$\begin{bmatrix} y^{(0)} \\ \vdots \\ y^{(P-1)} \end{bmatrix} = W \begin{bmatrix} x^{(0)} \\ \vdots \\ x^{(L-1)} \end{bmatrix}, \text{ where } W = \begin{bmatrix} W_A & 0 \\ 0 & W_B \end{bmatrix}, P = P_A + P_B, L = L_A + L_B,$$

$y^{(0)}, \ldots, y^{(P-1)}$ denotes PDSCH antenna ports $0, \ldots, P-1$. Note that PDSCH antenna ports $0, \ldots, P_A-1$ is QCL with CSI-RS resource A and PDSCH antenna ports $P_A, \ldots, P-1$ is QCL with CSI-RS resource B. $x^{(0)}, \ldots, x^{(L-1)}$ denotes MIMO layers $0, \ldots, L-1$. Note that MIMO layers $0, \ldots, L_A-1$ is associated with $1^{st}$ PDSCH and QCL with CSI-RS resource A (precoded with $W_A$) and MIMO layers $L_A, \ldots, L-1$ is associated with $2^{nd}$ PDSCH and QCL with CSI-RS resource B (precoded with $W_B$). The precoding matrix W of dimensions P×L comprises of precoding sub-matrices $W_A$ of dimension $P_A \times L_A$ and $W_B$ of dimension $P_B \times L_B$. CSI-resource index ($cri_1$) identifies the index of NZP-CSI-RS-Resource-A. $RI_1$, $PMI_1$, $il_1$ describes precoding matrix $W_A$. $CQI_1$ indicates the hypothetical MCS of $1^{st}$ PDSCH. $cri_2$ identifies the index of NZP-CSI-RS-Resource-B. $RI_2$, $PMI_2$, $il_2$ describes precoding matrix $W_B$. $CQI_2$ indicates the hypothetical MCS of the $2^{nd}$ PDSCH. If the hypothesis is 'cri-RI-CQI', the associated precoding matrix is assumed to be identity. If the hypothesis is 'cri-RI-i1-CQI', a hypothetical set of precoding matrices (corresponding to i2) is applied over different PRBs.

When two different TRPs are transmitting portions of the same PDSCH to the same UE, the NC-JT CSI hypothesis for the two different PDSCH portions may be defined for the UE as follows.

A CSI-ReportConfig is associated with NZP-CSI-RS-Resource-A as a channel measurement resource for the $1^{st}$ CSI-RS port-group and is associated with NZP-CSI-RS-Resource-B as a channel measurement resource for the $2^{nd}$ CSI-RS port-group. The CSI-ReportConfig is associated with a NC-JT CSI Hypotheses Type 11-20. The CSI-ReportConfig is associated with a codebookConfig applied to NZP-CSI-RS-Resource-A and the same or a separate codebookConfig for NZP-CSI-RS-Resource-B.

Note that NZP-CSI-RS-Resource-A acts as channel measurement resource for the first group of MIMO layers and NZP-CSI-RS-Resource-B acts a channel measurement resource for the second group of MIMO layers. Each MIMO layer contributes to interference to all other MIMO layers. Note that in FR2 or in case phase-noise is a significant issue for Tx/Rx link LI may be included with cri-RI-PMI-CQI that may be indicated as cri-RI-PMI-CQI-LI. Alternatively gNB can indicate UE to report LI when measured rank is above 1. In this section it is assumed that a PDSCH comprises of a single codeword (transport block). If a PDSCH comprises of two codewords (or transport blocks) then Table 1 is applicable with $1^{st}$ and $2^{nd}$ TB replacing $1^{st}$ and $2^{nd}$ PDSCH.

TABLE 1

Various possible NC-JT CSI hypothesis with two PDSCHs (or two TBs)

| NC-JT CSI Hypothesis | Hypothesis for $1^{st}$ PDSCH | Hypothesis for $2^{nd}$ PDSCH |
|---|---|---|
| Type 1 | $cri_1$-$RI_1$-$PMI_1$-$CQI_1$ | $cri_2$-$RI_2$-$PMI_2$-$CQI_2$ |
| Type 2 | $cri_1$-$RI_1$-$PMI_1$-$CQI_1$ | $cri_2$-$RI_2$-$il_2$ (Hybrid, RI, W1 only hypothesis) |
| Type 3 | $cri_1$-$RI_1$-$PMI_1$-$CQI_1$ | $cri_2$-$RI_2$-$il_2$-$CQI_2$ (semi-OL, pdsch-BundleSizeForCSI = 2 or 4) |
| Type 4 | $cri_1$-$RI_1$-$PMI_1$-$CQI_1$ | $cri_2$-$RI_2$-$CQI_2$ (precoded CSI-RS based) |
| Type 5 | $cri_1$-$RI_1$-$il_1$ (Hybrid, RI, W1 only feedback) | $cri_2$-$RI_2$-$il_2$-$CQI_2$ (semi-OL, pdsch-BundleSizeForCSI = 2 or 4) |
| Type 6 | $cri_1$-$RI_1$-$il_1$ (Hybrid, RI, W1 only feedback) | $cri_2$-$RI_2$-$CQI_2$ (precoded CSI-RS based) |
| Type 7 | $cri_1$-$RI_1$-$il_1$-$CQI_1$ (semi-OL, pdsch-BundleSizeForCSI = 2 or 4) | $cri_2$-$RI_2$-$CQI_2$ (precoded CSI-RS based) |
| Type 8 | $cri_1$-$RI_1$-$il_1$ (Hybrid, RI, W1 only feedback) | $cri_2$-$RI_2$-$il_2$ (Hybrid, RI, W1 only hypothesis) |
| Type 9 | $cri_1$-$RI_1$-$il_1$-$CQI_1$ (semi-OL, pdsch-BundleSizeForCSI = 2 or 4) | $cri_2$-$RI_2$-$il_2$-$CQI_2$ (semi-OL, pdsch-BundleSizeForCSI = 2 or 4) |
| Type 10 | $cri_1$-$RI_1$-$CQI_1$ (precoded CSI-RS based) | $cri_2$-$RI_2$-$CQI_2$ (precoded CSI-RS based) |

TABLE 2

Various possible NC-JT CSI hypothesis with a single PDSCH with single TB

| NC-JT CSI Hypothesis | Hypothesis for $1^{st}$ port-group | Hypothesis for $2^{nd}$ port-group | Hypothesis for the PDSCH |
|---|---|---|---|
| Type 11 | $cri_1$-$RI_1$-$PMI_1$ | $cri_2$-$RI_2$-$PMI_2$ | CQI |
| Type 12 | $cri_1$-$RI_1$-$PMI_1$ | $cri_2$-$RI_2$-$il_2$ (Hybrid, RI, W1 only hypothesis) | CQI |

TABLE 2-continued

Various possible NC-JT CSI hypothesis with a single PDSCH with single TB

| NC-JT CSI Hypothesis | Hypothesis for $1^{st}$ port-group | Hypothesis for $2^{nd}$ port-group | Hypothesis for the PDSCH |
|---|---|---|---|
| Type 13 | $cri_1$-$RI_1$-$PMI_1$ | $cri_2$-$RI_2$-$i1_2$ (semi-OL, pdsch-BundleSizeForCSI = 2 or 4) | CQI |
| Type 14 | $cri_1$-$RI_1$-$PMI_1$ | $cri_2$-$RI_2$ (precoded CSI-RS based) | CQI |
| Type 15 | $cri_1$-$RI_1$-$i1_1$ (Hybrid, RI, W1 only feedback) | $cri_2$-$RI_2$-$i1_2$ (semi-OL, pdsch-BundleSizeForCSI = 2 or 4) | CQI |
| Type 16 | $cri_1$-$RI_1$-$i1_1$ (Hybrid, RI, W1 only feedback) | $cri_2$-$RI_2$ (precoded CSI-RS based) | CQI |
| Type 17 | $cri_1$-$RI_1$-$i1_1$ (semi-OL, pdsch-BundleSizeForCSI = 2 or 4) | $cri_2$-$RI_2$ (precoded CSI-RS based) | CQI |
| Type 18 | $cri_1$-$RI_1$-$i1_1$ (Hybrid, RI, W1 only feedback) | $cri_2$-$RI_2$-$i1_2$ (Hybrid, RI, W1 only hypothesis) | — |
| Type 19 | $cri_1$-$RI_1$-$i1_1$ (semi-OL, pdsch-BundleSizeForCSI = 2 or 4) | $cri_2$-$RI_2$-$i1_2$ (semi-OL, pdsch-BundleSizeForCSI = 2 or 4) | CQI |
| Type 20 | $cri_1$-$RI_1$ (precoded CSI-RS based) | $cri_2$-$RI_2$ (precoded CSI-RS based) | CQI |

For the purposes of CSI computation hypothesis, a UE assumes the following:

$$\begin{bmatrix} y^{(0)} \\ \vdots \\ y^{(P-1)} \end{bmatrix} = W \begin{bmatrix} x^{(0)} \\ \vdots \\ x^{(L-1)} \end{bmatrix}, \text{ where } W = \begin{bmatrix} W_A & 0 \\ 0 & W_B \end{bmatrix}, P = P_A + P_B, L = L_A + L_B,$$

$y^{(0)}, \ldots, y^{(P-1)}$ denotes PDSCH antenna ports $0, \ldots, P-1$. Note that PDSCH antenna ports $0, \ldots, P_A-1$ is QCL with CSIRS resource A and PDSCH antenna ports $P_A, \ldots, P-1$ is QCL with CSIRS resource B. $x^{(0)}, \ldots, x^{(L-1)}$ denotes MIMO layers $0, \ldots, L-1$. Note that MIMO layers $0, \ldots, L_A-1$ is associated with $1^{st}$ port-group and QCL with CSIRS resource A (precoded with $W_A$) and MIMO layers $L_A, \ldots, L-1$ is associated with $2^{nd}$ port-group and QCL with CSIRS resource B (precoded with $W_B$). The precoding matrix W of dimensions P×L comprises of precoding submatrices $W_A$ of dimension $P_A \times L_A$ and $W_B$ of dimension $P_B \times L_B$. $cri_1$ identifies the index of NZP-CSI-RS-Resource-A. $RI_1$, $PMI_1$, $i1_1$ describes precoding matrix $W_A$. $cri_2$ identifies the index of NZP-CSI-RS-Resource-B. $RI_2$, $PMI_2$, $i1_2$ describes precoding matrix $W_B$. CQI indicates the hypothetical MCS of the PDSCH that includes the effect of $cri_1$, $cri_2$, $W_A$ and $W_B$. If the hypothesis is 'cri-RI-CQI', the associated precoding matrix is assumed to be identity. If the hypothesis is 'cri-RI-i1-CQI', a hypothetical set of precoding matrices (corresponding to i2) is applied over different PRBs.

When two different TRPs are transmitting two different PDSCHs to the same UE, the NC-JT report quantities for the two different PDSCHs may be defined for the UE as follows.

A NC-JT CSI Report Quantity is defined as a pair of {Report Quantity1, Report Quantity2} where Report Quantity1 is associated with $1^{st}$ PDSCH/TB and Report Quantity2 is associated with $2^{nd}$ PDSCH/TB. With reference to Table 1 several possible NC-JT CSI Report Quantities are defined as follows:

TABLE 3

NC-JT CSI Report Quantity described associated with {$1^{st}$ PDSCH/TB, $2^{nd}$ PDSCH/TB}

| NC-JT CSI Hypothesis | NC-JT CSI Report Quantity |
|---|---|
| Type 1 | {$cri_1$-$RI_1$-$PMI_1$-$CQI_1$, $cri_2$-$RI_2$-$PMI_2$-$CQI_2$} |
| Type 2 | {$cri_1$-$RI_1$-$PMI_1$-$CQI_1$, $cri_2$-$RI_2$-$i1_2$} |
| Type 3 | {$cri_1$-$RI_1$-$PMI_1$-$CQI_1$, $cri_2$-$RI_2$-$i1_2$-$CQI_2$} |
| Type 4 | {$cri_1$-$RI_1$-$PMI_1$-$CQI_1$, $cri_2$-$RI_2$-$CQI_2$} |
| Type 5 | {$cri_1$-$RI_1$-$i1_1$, $cri_2$-$RI_2$-$i1_2$-$CQI_2$} |
| Type 6 | {$cri_1$-$RI_1$-$i1_1$, $cri_2$-$RI_2$-$CQI_2$} |
| Type 7 | {$cri_1$-$RI_1$-$i1_1$-$CQI_1$, $cri_2$-$RI_2$-$CQI_2$} |
| Type 8 | {$cri_1$-$RI_1$-$i1_1$, $cri_2$-$RI_2$-$i1_2$} |
| Type 9 | {$cri_1$-$RI_1$-$i1_1$-$CQI_{1,}$ $cri_2$-$RI_2$-$i1_2$-$CQI_2$} |
| Type 10 | {$cri_1$-$RI_1$-$CQI_{1,}$ $cri_2$-$RI_2$-$CQI_2$} |

When two different TRPs are transmitting portions of the same PDSCH to the same UE, the NC-JT CSI report quantities for the two different PDSCH portions may be defined for the UE as follows.

A NC-JT CSI Report Quantity is defined as a triplet of {Report Quantity1, Report Quantity2, Report Quantity3} where Report Quantity1 is associated with $1^{st}$ port-group, Report Quantity2 is associated with $2^{nd}$ port-group and Report Quantity3 is associated with the entire PDSCH. With reference to Table 2 several possible NC-JT CSI Report Quantities can be defined as follows:

TABLE 4

NC-JT CSI Report Quantity described associated with {$1^{st}$ port-group, $2^{nd}$ port-group, PDSCH}

| NC-JT CSI Hypothesis | NC-JT CSI Report Quantity |
|---|---|
| Type 11 | {$cri_1$-$RI_1$-$PMI_1$, $cri_2$-$RI_2$-$PMI_2$, CQI} |
| Type 12 | {$cri_1$-$RI_1$-$PMI_1$, $cri_2$-$RI_2$-$i1_2$, CQI} |
| Type 13 | {$cri_1$-$RI_1$-$PMI_1$, $cri_2$-$RI_2$-$i1_2$, CQI} |
| Type 14 | {$cri_1$-$RI_1$-$PMI_1$, $cri_2$-$RI_2$, CQI} |
| Type 15 | {$cri_1$-$RI_1$-$i1_1$, $cri_2$-$RI_2$-$i1_2$, CQI} |
| Type 16 | {$cri_1$-$RI_1$-$i1_1$, $cri_2$-$RI_2$, CQI} |
| Type 17 | {$cri_1$-$RI_1$-$i1_1$, $cri_2$-$RI_2$, CQI} |
| Type 18 | {$cri_1$-$RI_1$-$i1_1$, $cri_2$-$RI_2$-$i1_2$} |
| Type 19 | {$cri_1$-$RI_1$-$i1_1$, $cri_2$-$RI_2$-$i1_2$, CQI} |
| Type 20 | {$cri_1$-$RI_1$, $cri_2$-$RI_2$, CQI} |

Alternatively, a NC-JT CSI Report Quantity is defined as the Report Quantity associated with the $1^{st}$ PDSCH/TB. In this case, Table 3 reduces to the following (Report quantity associated with $2^{nd}$ PDSCH/port-group is not included):

TABLE 5

NC-JT CSI Report Quantity described associated with {$1^{st}$ PDSCH/port-group}

| NC-JT CSI Hypothesis as in Table 1 | NC-JT CSI Report Quantity |
|---|---|
| Type 1-4 | cri-RI-PMI-CQI-(LI) |
| Type 5-6, 8-9 | cri-RI-i1 (Hybrid, RI, W1 only feedback) |
| Type 7 | cri-RI-i1-CQI (semi-OL, pdsch-BundleSizeForCSI = 2 or 4) |
| Type 10 | cri-RI-CQI (precoded CSI-RS based) |

There are several types of CSI feedback that a UE can provide to the TRPs.

| CSI Hypothesis category | Channel resource for 1$^{st}$ PDSCH | Channel resource for 2$^{nd}$ PDSCH |
|---|---|---|
| Type a | CSI-RS A | |
| Type b | CSI-RS A | CSI-RS B |
| Type c | CSI-RS A (1$^{st}$ port-group), CSI-RS B (2$^{nd}$ port-group) | |

Type a: Corresponds to a single PDSCH hypothesis where the PDSCH is QCL with CSI-RS A. A single TRP transmission falls under this category Type b: NC-JT transmission hypothesis corresponding to two PDSCHs—one PDSCH QCL with CSI-RS A and another PDSCH QCL with CSI-RS B. This set of hypotheses is described in Table 1.

Type c: NC-JT transmission hypothesis corresponding to single PDSCH—first group of layers QCL with CSI-RS A and second group of layers QCL with CSI-RS B. This set of hypotheses is described in Table 2.

A TRP/gNB may indicate the CSI Hypothesis category type to the UE wherein the UE only reports a Report Quantity associated with that CSI Hypothesis. A TRP/gNB may indicate a set of candidate CSI Hypothesis categories (for example Type a and Type b) and the UE may report a Report Quantity associated with a CSI hypothesis and a corresponding CSI Hypothesis category that maximizes link performance.

Figure 3A:
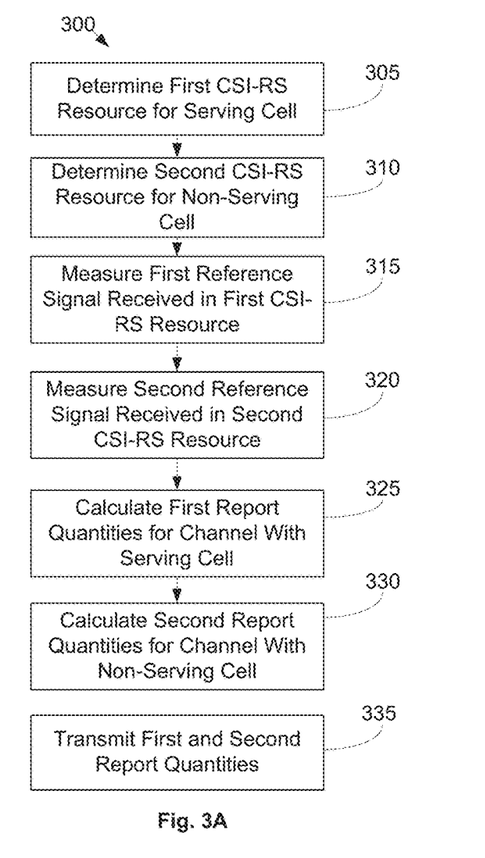
FIG. 3A is a flow diagram depicting an exemplary method of measuring and providing CSI feedback in accordance with some examples.

FIG. 3A illustrates flow diagram of an exemplary method 300 that can be performed by a UE to provide feedback to multiple serving cells regarding channel status. The method 300 may be performed, for example, by baseband processor 130 of the UE 120 of FIGS. 1, 2, and 4. The method includes, at 305, determining a first channel state information (CSI) reference signal (RS) resource associated with a serving cell for the UE. The method includes, at 310, determining a second CSI-RS resource associated with a non-serving cell for the UE. The method includes, at 315, measuring a first reference signal received in the first CSI-RS resource. The method includes, at 320, measuring a second reference signal received in the second CSI-RS resource.

The method includes, at 325, calculating first report quantities characterizing a channel between the UE and the serving cell based on the measurement of the first reference signal. The method includes, at 330, calculating second report quantities characterizing a channel between the UE and the non-serving cell based on the measurement of the second reference signal. The method includes, at 305, transmitting the first report quantities and the second report quantities to one or both of the serving cell and the non-serving cell.

Figure 3B:
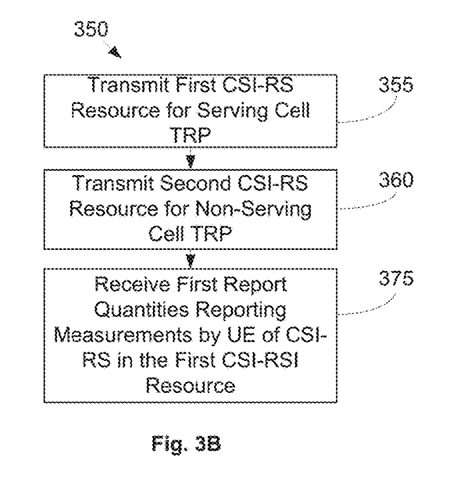
FIG. 3B is a flow diagram depicting an exemplary method of configuring CSI feedback in accordance with some examples.

FIG. 3B illustrates flow diagram of an exemplary method 350 that can be performed by a TRP to configure CSI reporting for a UE receiving joint transmissions of downlink data. The method 350 may be performed, for example, by baseband processor 110 of the TRP 100 of FIGS. 1, 2, and 5. The method includes, at 355, transmitting, to a UE in a same serving cell as the TRP, information indicative of a first channel state information (CSI) reference signal (RS) resource associated the TRP. The method includes, at 360, transmitting, to the UE, information indicative of a second CSI-RS resource associated with a second TRP in a non-serving cell for the UE. The method includes, at 365, receiving first report quantities reporting measurements made by the UE based on CSI-RS signals received in the first CSI-RS resource.

FIG. 4 illustrates a user device 120 (see also FIGS. 1 and 2) in accordance with an aspect. The user device 120 may be a mobile device or a user equipment (UE) in some aspects. The device 120 is configured to transmit and receive RF signals and includes an application processor 405, baseband processor 130 (also referred to as a baseband module), radio front end module (RFEM) 415 (also referred to as a radio interface), memory 420, connectivity module 425, near field communication (NFC) controller 430, audio driver 435, camera driver 440, touch screen 445, display driver 450, sensors 455, removable memory 460, power management integrated circuit (PMIC) 465 and smart battery 470.

In some aspects, application processor 405 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 130 may be implemented, for example, as a solder-down substrate including one or more integrated circuits, a single packaged integrated circuit soldered to a main circuit board, and/or a multi-chip module containing two or more integrated circuits.

FIG. 5 illustrates an example base station or gNB/TRP/eNB 100 (See also FIGS. 1 and 2) in accordance with an aspect. The eNB 100 is configured to transmit and receive RF signals and may include one or more of application processor 505, baseband modules 110 (also referred to as baseband processors), one or more radio front end modules 515 (also referred to as a radio interface), memory 520, power management circuitry 525, power tee circuitry 530, network controller 535, network interface connector 540, satellite navigation receiver module 545, and user interface 550.

In some aspects, application processor 505 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board or a multi-chip module containing two or more integrated circuits.

In some aspects, memory 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 520 may be implemented as one or more of solder down packaged integrated circuits, socketed memory modules and plug-in memory cards.

In some aspects, power management integrated circuitry 525 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 530 may provide for electrical power drawn from a network cable to provide both power supply and data connectivity to the base station 100 using a single cable.

In some aspects, network controller 535 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 545 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 545 may provide data to application processor 505 which may include one or more of position data or time data. Application processor 505 may use time data to synchronize operations with other radio base stations.

In some aspects, user interface 550 may include one or more of physical or virtual buttons, such as a reset button, one or more indicators such as light emitting diodes (LEDs) and a display screen.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

For one or more examples, at least one of the components set forth in one or more of the preceding Figs may be configured to perform one or more operations, techniques, processes, and/or methods as set forth in the example section below. For example, the baseband circuitry as described above in connection with one or more of the preceding Figs may be configured to operate in accordance with one or more of the examples set forth below. For another example, circuitry associated with a UE, base station, network element, etc. as described above in connection with one or more of the preceding Figs may be configured to operate in accordance with one or more of the examples set forth below in the example section.

EXAMPLES

Example 1 is an apparatus for a user equipment device (UE), including baseband circuitry having a radio frequency (RF) interface configured to transmit and receive RF signals, and one or more processors. The one or more processors are configured to: determine a first channel state information (CSI) reference signal (RS) resource associated with a serving cell for the UE; determine a second CSI-RS resource associated with a non-serving cell for the UE; measure a first reference signal received in the first CSI-RS resource; measure a second reference signal received in the second CSI-RS resource; and calculate first report quantities characterizing a channel between the UE and the serving cell based on the measurement of the first reference signal; calculate second report quantities characterizing a channel between the UE and the non-serving cell based on the measurement of the second reference signal; and transmit the first report quantities and the second report quantities to one or both of the serving cell and the non-serving cell.

Example 2 includes the subject matter of example 1, including or omitting optional elements, wherein the one or more processors are configured to determine the first CSI-RS resource based on a NZP-CSI-RS-ResourceSet parameter received from the serving cell.

Example 3 includes the subject matter of example 1, including or omitting optional elements, wherein the one or more processors are configured to determine the second CSI-RS resource based a mobility resource configuration of the non-serving cell received from the serving cell.

Example 4 includes the subject matter of example 3, including or omitting optional elements, wherein the one or more processors are configured to determine the second CSI-RS resource based on a NZP-CSI-RS-ResourceSet parameter communicated in a CSI-RS-Resource-Mobility parameter by the serving cell, wherein the NZP-CSI-RS-ResourceSet parameter includes one or more of a physical cell identity, a sub-carrier spacing, measurement bandwidth, synchronization signal and a quasi-co-located physical broadcast channel (PBCH) block, number of ports, frequency and time-domain resource element mapping for ports, and a scrambling sequence used for channel estimation.

Example 5 includes the subject matter of example 1, including or omitting optional elements, wherein the one or more processors are configured to calculate the first report quantities and the second report quantities based on a first hypothesis and a second hypothesis, respectively.

Example 6 includes the subject matter of example 5, including or omitting optional elements, wherein the one or more processors are configured to determine the first hypothesis and the second hypothesis based on a hypothesis set selection parameter indicated in signaling received from the serving cell.

Example 7 includes the subject matter of example 6, including or omitting optional elements, wherein the serving cell and non-serving cell are scheduled to transmit unique PDSCHs to the UE, and further wherein the first hypothesis and the second hypothesis each specify a CSI-resource index (cri), a rank indicator (RI), a precoding matrix indicator (PMI), and a channel quality indicator (Cal).

Example 8 includes the subject matter of example 6, including or omitting optional elements, wherein the serving cell and non-serving cell are scheduled to transmit portions of a single PDSCH to the UE, wherein the first hypothesis and the second hypothesis each specify a CSI-resource index (cri), a rank indicator (RI), and a precoder matrix indicator (PMI), and further wherein the one or more processors are configured to calculate the first report quantities and the second report quantities based on a third hypothesis that is identified by the hypothesis set selection parameter and specifies a channel quality indicator (CQI).

Example 6 includes the subject matter of example 6, including or omitting optional elements, wherein the one or more processors are configured to select report quantities for the first report quantities and the second report quantities based on the hypothesis set selection parameter.

Example 10 includes the subject matter of example 1, including or omitting optional elements, wherein the one or more processors are configured to calculate report quantities for at least two different sets of hypotheses and transmit the first report quantities and the second report quantities for a set of hypotheses that maximizes link performance.

Example 11 is a method, including, with a user equipment (UE) device: determining a first channel state information (CSI) reference signal (RS) resource associated with a serving cell for the UE; determining a second CSI-RS resource associated with a non-serving cell for the UE; measuring a first reference signal received in the first CSI-RS resource; measuring a second reference signal received in the second CSI-RS resource; and calculating first report quantities characterizing a channel between the UE and the serving cell based on the measurement of the first reference signal; calculating second report quantities characterizing a channel between the UE and the non-serving cell based on the measurement of the second reference signal; and transmitting the first report quantities and the second report quantities to one or both of the serving cell and the non-serving cell.

Example 12 includes the subject matter of example 11, including or omitting optional elements, including determining the first CSI-RS resource based on a NZP-CSI-RS-ResourceSet parameter received from the serving cell.

Example 13 includes the subject matter of example 11, including or omitting optional elements, including determining the second CSI-RS resource based a mobility resource configuration of the non-serving cell received from the serving cell.

Example 14 includes the subject matter of example 13, including or omitting optional elements, including determining the second CSI-RS resource based on a NZP-CSI-RS-ResourceSet parameter communicated in a CSI-RS-Resource-Mobility parameter by the serving cell, wherein the NZP-CSI-RS-ResourceSet parameter includes one or more of a physical cell identity, a sub-carrier spacing, measurement bandwidth, synchronization signal and a quasi-co-located physical broadcast channel (PBCH) block, number of ports, frequency and time-domain resource element mapping for ports, and a scrambling sequence used for channel estimation.

Example 15 includes the subject matter of example 14, including or omitting optional elements, including determining a first hypothesis and a second hypothesis based on a hypothesis set selection parameter indicated in signaling received from the serving cell; and calculating the first report quantities and the second report quantities based on a first hypothesis and a second hypothesis, respectively.

Example 16 includes the subject matter of example 11, including or omitting optional elements, including calculating report quantities for at least two different sets of hypotheses; and transmitting the first report quantities and the second report quantities for a set of hypotheses that maximizes link performance.

Example 17 is an apparatus for a transmission/reception point (TRP), including baseband circuitry having a radio frequency (RF) interface configured to transmit and receive RF signals, and one or more processors. The processors are configured to: transmit, to a UE in a same serving cell as the TRP, information indicative of a first channel state information (CSI) reference signal (RS) resource associated the TRP; transmit, to the UE, information indicative of a second CSI-RS resource associated with a second TRP in a non-serving cell for the UE; and receive first report quantities reporting measurements made by the UE based on CSI-RS signals received in the first CSI-RS resource.

Example 18 includes the subject matter of example 17, including or omitting optional elements, wherein the one or more processors are configured to receive second report quantities reporting measurements made by the UE based on CSI-RS signals received in the second CSI-RS resource.

Example 19 includes the subject matter of example 17, including or omitting optional elements, wherein the one or more processors are configured to transmit the information indicative of the second CSI-RS resource based on a mobility resource configuration of the non-serving cell.

Example 20 is a method, including, with a transmission/reception point (TRP), transmitting, to a UE in a same serving cell as the TRP, information indicative of a first channel state information (CSI) reference signal (RS) resource associated the TRP; transmitting, to the UE, information indicative of a second CSI-RS resource associated with a second TRP in a non-serving cell for the UE; and receiving first report quantities reporting measurements made by the UE based on CSI-RS signals received in the first CSI-RS resource.

Example 21 includes the subject matter of example 20, including or omitting optional elements, including receiving second report quantities reporting measurements made by the UE based on CSI-RS signals received in the second CSI-RS resource.

Example 22 includes the subject matter of example 20, including or omitting optional elements, including transmitting the information indicative of the second CSI-RS resource based on a mobility resource configuration of the non-serving cell.

Any of the above described examples may be combined with any other example (or combination of examples), unless explicitly stated otherwise. The foregoing description of one or more implementations provides illustration and description, but is not intended to be exhaustive or to limit the scope of examples to the precise form disclosed. Modifications and variations are possible in light of the above teachings or may be acquired from practice of various examples.

We claim:

1. A baseband processor of a user equipment device (UE), configured to, when executing instructions stored in a memory, perform operation comprising:
   receiving, from a serving cell of the UE, a channel state information (CSI) configuration that indicates
      a first CSI reference signal (RS) resource associated with a serving cell for the UE,
      a second CSI-RS resource associated with a non-serving cell for the UE, wherein the second CSI-RS resource comprises a mobility resource configuration of the non-serving cell, and
      a hypothesis set selection parameter,
   wherein the hypothesis set selection parameter indicates a first hypothesis for the first CSI-RS resource and a second hypothesis for the second CSI-RS resource, wherein each hypothesis includes at least one of CSI-resource index (cri), a rank indicator (RI), a precoding matrix indicator (PMI), or a channel quality indicator (CQI), wherein parameters included in a hypothesis for a CSI-RS resource differ based on a transmission scheme of the CSI-RS;
   measuring a first reference signal received in the first CSI-RS resource;
   measuring a second reference signal received in the second CSI-RS resource;
   based on the first hypothesis, calculating at least one first report quantity characterizing a channel between the UE and the serving cell based on the measurement of the first reference signal;
   based on the second hypothesis, calculating at least one second report quantity characterizing a channel between the UE and the non-serving cell based on the measurement of the second reference signal; and
   transmitting the at least one first report quantity and the at least one second report quantity to one or both of the serving cell and the non-serving cell.

2. The baseband processor of claim 1, further configured to perform operation comprising:
   receiving a first portion of a PDSCH signal from the serving cell;
   receiving a second portion of the PDSCH signal on the same frequency and time resources as the first portion of the PDSCH signal from the non-serving cell; and
   decoding the first portion of the PDSCH signal and the second portion of the PDSCH signal with an assumption that a first precoding applied to the first portion of the PDSCH signal has zero influence on a second precoding applied to the second portion of the PDSCH signal.

3. The baseband processor of claim 1, wherein the configuration of the second CSI-RS resource comprises a NZP-CSI-RS-ResourceSet parameter communicated in a CSI-RS-Resource-Mobility parameter by the serving cell, wherein the NZP-CSI-RS-ResourceSet parameter comprises one or more of a physical cell identity, a sub-carrier spacing, measurement bandwidth, synchronization signal and a quasi-co-located physical broadcast channel (PBCH) block, number of ports, frequency and time-domain resource element mapping for ports, and a scrambling sequence used for channel estimation.

4. The baseband processor of claim 1, wherein the serving cell and non-serving cell are scheduled to transmit portions of a single PDSCH to the UE, further wherein the baseband processor is further configured to perform operations comprising:
calculating the at least one first report quantity and the at least one second report quantity further based on a third hypothesis that is identified by the hypothesis set selection parameter and specifies a channel quality indicator (CQI).

5. The baseband processor of claim 1, further configured to perform operations comprising:
receiving a configuration of an association between respective hypothesis set selection parameters and respective sets of at least one first report quantity for the first CSI-RS resource and at least one second report quantity for the second CSI-RS resource; and
selecting report quantities for the at least one first report quantity and the at least one second report quantity based on the hypothesis set selection parameter.

6. The baseband processor of claim 1, further configured to perform operations comprising :
calculating report quantities for at least two different sets of hypotheses and transmit the at least one first report quantity and the second at least one report quantity for a set of hypotheses that maximizes link performance.

7. A method, comprising, with a user equipment (UE) device:
receiving, from a serving cell of the UE, a channel state information (CSI) configuration that indicates
a first CSI reference signal (RS) resource associated with a serving cell for the UE,
a second CSI-RS resource associated with a non-serving cell for the UE, wherein the second CSI-RS resource comprises a mobility resource configuration of the non-serving cell, and
a hypothesis set selection parameter,
wherein the hypothesis set selection parameter indicates a first hypothesis for the first CSI-RS resource and a second hypothesis for the second CSI-RS resource, wherein each hypothesis includes at least one of CSI-resource index (cri), a rank indicator (RI), a precoding matrix indicator (PMI), or a channel quality indicator (CQI), wherein parameters included in a hypothesis for a CSI-RS resource differ based on a transmission scheme of the CSI-RS;
measuring a first reference signal received in the first CSI-RS resource;
measuring a second reference signal received in the second CSI-RS resource;
based on the first hypothesis, calculating at least one first report quantity characterizing a channel between the UE and the serving cell based on the measurement of the first reference signal;
based on the second hypothesis, calculating at least one second report quantity characterizing a channel between the UE and the non-serving cell based on the measurement of the second reference signal; and
transmitting the at least one first report quantity and the at least one second report quantity to one or both of the serving cell and the non-serving cell.

8. The method of claim 7, further comprising:
receiving a first PDSCH from the serving cell on a first resource;
receiving a second PDSCH from the non-serving cell that overlaps in time and frequency with the first PDSCH; and
decoding the first PDSCH using a first precoding matrix, decoding the second PDSCH using a second precoding matrix, and wherein the first precoding matrix is different from the second precoding matrix.

9. The method of claim 7, wherein the configuration of the second CSI-RS resource comprises a NZP-CSI-RS-ResourceSet parameter communicated in a CSI-RS-Resource-Mobility parameter by the serving cell, wherein the NZP-CSI-RS-ResourceSet parameter comprises one or more of a physical cell identity, a sub-carrier spacing, measurement bandwidth, synchronization signal and a quasi-co-located physical broadcast channel (PBCH) block , number of ports, frequency and time-domain resource element mapping for ports, and a scrambling sequence used for channel estimation.

10. The method of claim 7, comprising:
calculating report quantities for at least two different sets of hypotheses; and
transmitting the at least one first report quantity and the at least one second report quantity for a set of hypotheses that maximizes link performance.

11. A baseband processor of a transmission and reception point (TRP) configured to perform operations comprising:
causing transmission of, to a UE in a same serving cell as the TRP, a channel state information (CSI) configuration that indicates a first CSI reference signal (RS) resource associated with the TRP, a second CSI-RS resource associated with a second TRP in a non-serving cell for the UE, and a hypothesis set selection parameter;
wherein the second CSI-RS resource comprises a mobility resource configuration of the non-serving cell;
wherein the hypothesis set selection parameter indicates a first hypothesis for the first CSI-RS resource and a second hypothesis for the second CSI-RS resource, wherein each hypothesis includes at least one of CSI-resource index (cri), a rank indicator (RI), a precoding matrix indicator (PMI), or a channel quality indicator (CQI), wherein parameters included in a hypothesis for a CSI-RS resource differ based on a transmission scheme of the CSI-RS; and
receiving at least one first report quantity reporting measurements made by the UE based on CSI-RS signals received in the first CSI-RS resource and the first hypothesis.

12. The baseband processor of claim 11, further configured to perform operations comprising:
receiving at least one second report quantity reporting measurements made by the UE based on CSI-RS signals received in the second CSI-RS resource.

13. A method, comprising, with a transmission and reception point (TRP):
transmitting, to a UE in a same serving cell as a transmission/reception point (TRP), a channel state information (CSI) configuration that indicates a first CSI reference signal (RS) resource associated with the TRP, a second CSI-RS resource associated with a second TRP in a non-serving cell for the UE, and a hypothesis set selection parameter;
wherein the second CSI-RS resource comprises a mobility resource configuration of the non-serving cell;

wherein the hypothesis set selection parameter indicates a first hypothesis for the first CSI-RS resource and a second hypothesis for the second CSI-RS resource, wherein each hypothesis includes at least one of CSI-resource index (cri), a rank indicator (RI), a precoding matrix indicator (PMI), or a channel quality indicator (CQI), wherein parameters included in a hypothesis for a CSI-RS resource differ based on a transmission scheme of the CSI-RS; and receiving at least one first report quantity reporting measurements made by the UE based on CSI-RS signals received in the first CSI-RS resource and the first hypothesis.

14. The method of claim 13, comprising receiving at least one second report quantity reporting measurements made by the UE based on CSI-RS signals received in the second CSI-RS resource.

\* \* \* \* \*